(12) United States Patent
Van Bosch et al.

(10) Patent No.: US 8,005,453 B2
(45) Date of Patent: Aug. 23, 2011

(54) CONTROLLING THE POWER IN A WIRELESS CLIENT DEVICE

(75) Inventors: James A. Van Bosch, Crystal Lake, IL (US); Robert F. D'Avello, Lake Zurich, IL (US)

(73) Assignee: Continental Automotive Systems, Inc., Deer Park, IL (US)

( * ) Notice: Subject to any disclaimer, the term of this patent is extended or adjusted under 35 U.S.C. 154(b) by 94 days.

(21) Appl. No.: 12/605,358

(22) Filed: Oct. 25, 2009

(65) Prior Publication Data
US 2010/0165899 A1 Jul. 1, 2010

Related U.S. Application Data

(63) Continuation of application No. 10/412,179, filed on Apr. 11, 2003, now Pat. No. 7,610,035.

(60) Provisional application No. 60/437,406, filed on Dec. 31, 2002.

(51) Int. Cl.
*H04B 1/16* (2006.01)
(52) U.S. Cl. .................. 455/343.2; 455/343.4; 455/418
(58) Field of Classification Search ............... 455/343.2, 455/343.4, 418
See application file for complete search history.

(56) References Cited

U.S. PATENT DOCUMENTS

| | | | | |
|---|---|---|---|---|
| 5,428,820 | A * | 6/1995 | Okada et al. | 340/7.33 |
| 6,016,312 | A * | 1/2000 | Storm et al. | 370/311 |
| 6,480,476 | B1 * | 11/2002 | Willars | 370/311 |
| 6,741,836 | B2 * | 5/2004 | Lee et al. | 455/41.2 |
| 6,804,503 | B2 * | 10/2004 | Shohara et al. | 455/343.4 |
| 6,804,542 | B1 * | 10/2004 | Haartsen | 455/574 |

* cited by examiner

*Primary Examiner* — Simon Sing

(57) ABSTRACT

A system and method in a client device (22) for controlling the power within the client device (22). The client device (22) has a network access device (30, 130), a programmable timer (48), and a controller (42). The network access device (30, 130) has at least a powered state and a power-off state. The programmable timer (48) operates the network access device (30, 130) in the powered state. The controller (42) is coupled to the programmable timer (48) and is capable of providing a time period for operating the network access device (30, 130) in the powered state. The controller (42) determines the time period based on a discontinuous reception (DRX) parameter obtained from the network access device (30, 130). The network access device (130) may include a transceiver. The network access device (30) may also include a transceiver and a controller. There are also methods of operating the client device (22) to control the power within the device.

20 Claims, 6 Drawing Sheets

CONTROLLING THE POWER IN A WIRELESS CLIENT DEVICE

The present application claims priority from provisional application Ser. No. 60/437,406, entitled "System and Method for Controlling the Power in a Wireless Client Device," filed Dec. 31, 2002, which is commonly owned and incorporated herein by reference in its entirety.

FIELD OF THE INVENTION

This invention in general relates to controlling the power in a wireless client device and, more particularly, to a system and method that controls the power within the device based on a discontinuous reception (DRX) parameter obtained from a wireless network.

BACKGROUND OF THE INVENTION

Telematics systems are being designed to deliver a wide spectrum of information and services via wireless links to vehicle-based subscribers. For instance, Telematics systems are being designed to allow remote service centers to control certain vehicle functions. A remote service center or remote device may be used to unlock or lock the vehicle's doors, to flash the vehicle's lights, to sound the horn, or to start the vehicle's engine. The remote service center may also be used to perform other functions such as theft tracking.

Some of these services must be capable of being performed when the vehicle's engine is turned off such as the unlocking of vehicle's doors and theft tracking. This requires that the Telematics system be powered so that it may monitor and receive commands and data. Today's Telematics systems, however, consume too much power to allow these systems to be continually powered on. The vehicle's battery must be protected from excessive drainage.

In the past, after the vehicle's engine is shut-off, the Telematics unit is powered for a fixed time period or cycled on and off for a fixed time period and then shut off completely to avoid draining the vehicle's battery. Current designs, however, typically only allow manufacturers to leave the system in a powered state for about forty-eight hours. A need exists for providing a Telematics system that can be powered for a much longer duration after the vehicle's engine is shut-off.

It is, therefore, desirable to provide a battery-powered client device that can operate for longer durations to overcome or minimize most, if not all, of the preceding problems.

Figure 1:
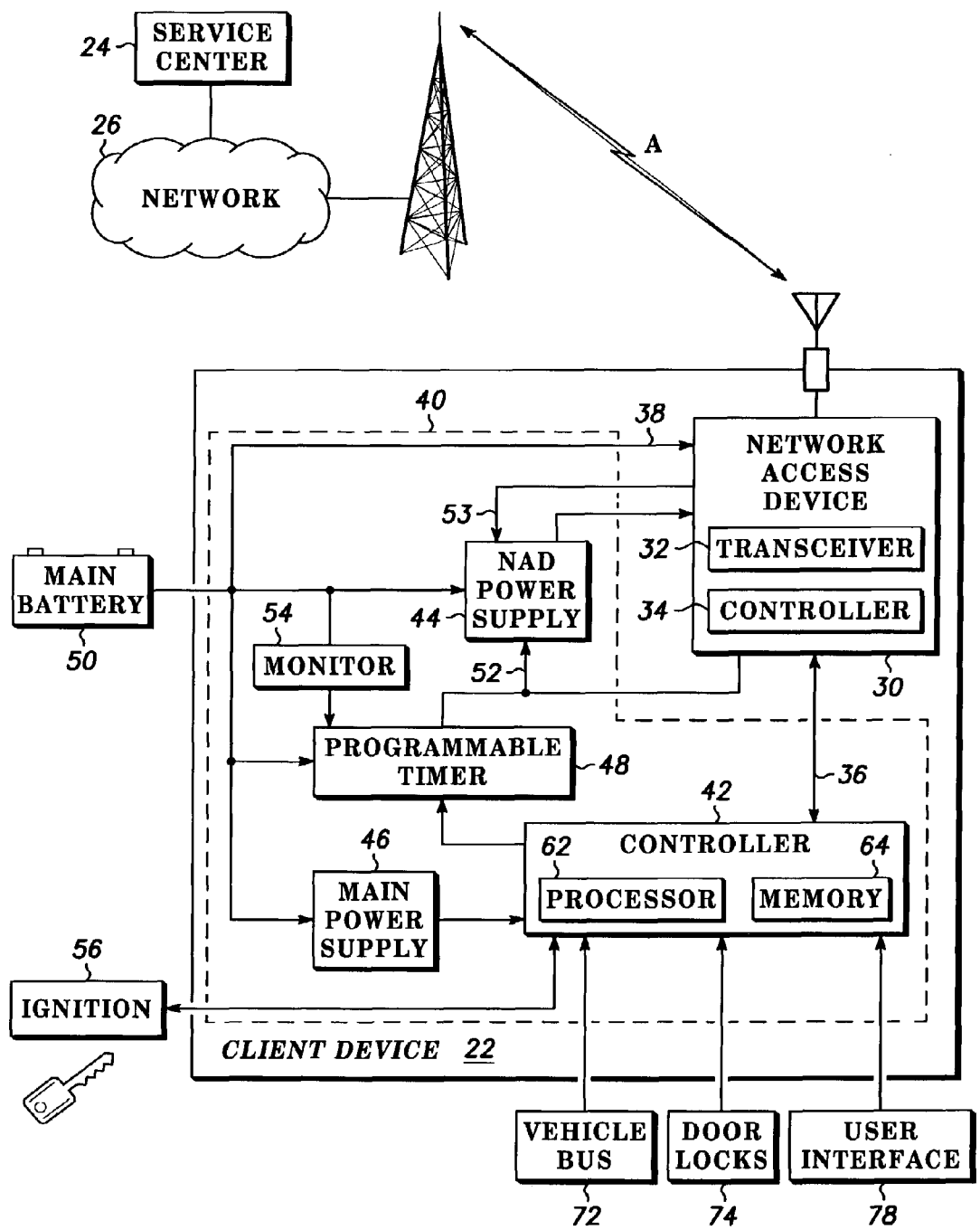
FIG. 1 is a block diagram of a communication system according to one embodiment of the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DETAILED DESCRIPTION

What is described is a system and method for controlling the power in a client device based on a discontinuous reception (DRX) parameter obtained from a wireless network. For purposes of illustration and description, an example of an application of a client device is described below in the context of a vehicle-based Telematics system. The present invention, however, is not limited to client devices in the form of vehicle-based Telematics systems but may also apply to other devices such as portable phones, personal digital assistances (PDAs), pagers, and the like. One of ordinary skill in the art having the benefit of this disclosure will realize that the devices and procedures described herein for controlling the power in a client device could be used in other applications.

To this end, in one embodiment, there is a client device comprising a network access device (NAD), a programmable timer, and a controller. The network access device receives messages over a communication channel and has a powered state and a power-off state. The programmable timer operates the network access device in a powered state. The controller is in communication with the programmable timer and is capable of providing a time period for operating the network access device in the powered state. The controller determines the time period based on a discontinuous reception parameter obtained from the network access device.

The controller may have a power-on state and a power-off state. The controller may switch from its power-on state to its power-off state after providing the time period to the programmable timer. The programmable timer may be a circuit that is separate from the controller or, alternatively, may be a timer or counter that is part of, or integral to, the controller. If the timer or counter were a part of the controller, the controller may then have a power-off state, a low-powered state, and a power-on state. The low-powered state would be a state where the circuitry of the programmable timer is provided with power but the power to the remaining circuitry of the controller would be in a sleep mode.

The network access device may simply include a transceiver or may include a transceiver and a controller. If another controller is used in the network access device, the network access device may be configured to monitor a voltage of a battery to determine whether the voltage of the battery is at or below a threshold. If the voltage is at or below the threshold, the network access device could switch itself to a power-off state.

The client device may further include, in an alternative embodiment, a current monitor that monitors an accumulated current drawn by the client device during the time period selected by the controller. The monitor may be configured to switch the client device to a power-off state if the accumulated current drawn by the client device meets or exceeds a predetermined threshold. Alternatively, the current monitor could monitor the accumulated current drawn by the network access device.

In another embodiment, the client device is embedded in a vehicle and comprises a network access device and a controller. The network access device has at least a powered state and a power-off state. The powered state allows the network access device to receive messages over a communication channel. The power-off state does not allow the network access device to receive messages over the communication channel. The controller determines a time period for the network access device. The time period defines the length of time that the network access device should be in the powered state after an ignition switch in the vehicle is turned off. The time period is based on a discontinuous reception parameter obtained from the network access device.

In a further embodiment, there is a method in a client device that has a network access device, a programmable timer, and a controller. The method comprises the steps of: obtaining a discontinuous reception parameter from a network; determining a time period for operating the network access device in a powered state based on the obtained discontinuous reception parameter; sending the time period to the programmable timer; and operating the network access device in a powered state during the time period. The method may further include steps such as: monitoring a voltage of a battery during the time period to determine whether the voltage of the battery is at or below a predetermined threshold; and switching the network access device to a power-off state if the voltage of the battery is at or below the predetermined threshold. The method may also include steps such as: monitoring a current drawn by the network access device during the time period; determining an accumulated current drawn by the network access device; and switching the network access device to a power-off state if the accumulated current drawn by the network access device meets or exceeds a predetermined threshold.

Now, turning to the drawings, FIG. 1 illustrates a block diagram of one embodiment of a communication system 20 for the present invention. Generally, the communication system 20 includes a client device 22 and a service center 24. In one embodiment, the client device 22 is a Telematics device that is embedded in a vehicle. Although only one client device 22 and service center 24 are shown, the invention may include any number of these elements interoperating with each other.

An intermediate network 26 may be used for wireless communications between the client device 22 and the service center 24. For instance, the network 26 could be one of several standard cellular communication networks, a satellite-based network, a public switched telecommunication network (PSTN), the Internet, an integrated services digital network (ISDN), and/or other communication networks.

A service provider may operate the service center 24 to provide Telematics applications and services to the client device 22. For instance, the service center 24 may contain operators, content servers and content databases. The content servers for Telematics applications and services may include traffic servers, map servers, user profile servers, location information servers, and the like. The content databases for Telematics applications and services may include location information, user profiles, traffic content, map content, point-of-interest content, usage history, and the like.

In one embodiment, the client device 22 may generally comprise a network access device (NAD) 30 and a control unit 40. In this embodiment, the network access device 30 includes at least a transceiver 32, but may also include a controller 34. The control unit 40 may include a controller 42, a NAD power supply 44, a main power supply 46, and a programmable timer 48. In FIG. 1, the client device 22 is shown as a single unit having a serial connection 36 between the network access device 30 and the controller 42 of the control unit 40. Although shown as a single unit in FIG. 1, the network access device 30 may be a separate unit from the client device 22. In particular, the network access device 30 may be part of a portable wireless communication device such as a phone, a personal digital assistant (PDA), a pager, and the like. An external interface could then be used to provide connectivity with the network access device 30.

The transceiver 32 in the network access device 30 is used for transmitting uplink communications and receiving downlink communication to and from the network 26 and service center 24 over wireless communication link A. The wireless communication link A may use a wireless protocol such as a standard cellular network protocol such as Advanced Mobile Phone Service (AMPS), Global System for Mobile Communications (GSM), Time Division Multiple Access (TDMA), Code Division Multiple Access (CDMA), and the like. To transmit data in the cellular environment, different types of standard bearer services exist including, but not limited to, general packet radio service (GPRS), short message service (SMS), circuit switched data service (CSD), and high-speed circuit switched data service (HSCSD). In another embodiment, standard transmission control protocol/internet protocol (TCP/IP) may also be used as well as satellite communications. In a further embodiment, the transceiver 32 may be enabled using other wireless technologies such as Bluetooth™ technology. Bluetooth™ technology allows for the replacement of a wired connection by enabling devices to communicate with each other through a universal short-range radio link. A Bluetooth™ specification is available on the Internet from the Bluetooth Special Interest Group (SIG) at www.bluetooth.com.

The network access device 30 is provided power from a battery such as a vehicle's main battery 50. A NAD power supply 44 may be connected between the network access device 30 and the vehicle's main battery 50. The NAD power supply 44 is capable of converting the battery 50 voltage to the network access device 30 operating voltage. As will be described in more detail below, the power supply 44 may have an input 52 for disabling the power source to the network access device 30. The power supply 44 may have another input 53 for switching the operating voltage of the network access device 30 from a normal operating voltage (such as 5 volts) to a relatively low operating voltage (such as 3 volts).

Generally, the power supply 44 may be disabled by components such as the programmable timer 48 (e.g., after expiration of a time period), the network access device 30 (e.g., after monitoring a low battery voltage), or by a current monitor 54 (e.g., after monitoring an excessive accumulated drawn current). With respect to the programmable timer 48, the controller 42 in the control unit 40 provides the programmable timer 48 with information on when the power to the network access device 30 should be disabled. The programmable timer 48 may be a circuit that is separate from the controller 42 or, alternatively, the programmable timer 48 may be part of, or otherwise integral to, the controller 42. The controller 42 receives a signal that the vehicle's ignition 56 has been turned off. In response, the controller 42 will then determine a time period for the programmable timer 48 to disable the power supply 44 to the network access device 30. As will be explained in more detail below, in one embodiment, the time period is based on a discontinuous reception (DRX) parameter from the controller 34 in the network access device 30. The network access device 30 receives the DRX parameter from the network 26.

In general, discontinuous reception is a technique that allows a handset to power down significant amounts of its internal circuitry for a high percentage of time when it is in the idle mode. It also ensures that the handset is aware of when page requests for it may be transmitted. For instance, a handset that supports discontinuous reception will "sleep" during times that it knows that its paging requests will not be transmitted. When the handset enters a particular paging area, part of the registration process includes obtaining from a wireless network a parameter that tells the handset how often to "wake up" and process a page. A term called the discontinuous reception factor (or "DRX factor") is used in GSM networks to notify handsets of the paging repetition rate within a particular area. The DRX factor is broadcast in the Broadcast Control Channel (BCCH). A lower value means that the paging message should be checked by the handsets at greater frequency intervals. This reduces the delay in setting up an incoming call but has the downside of draining the battery quicker. A higher value means that the paging messages should be checked by the handsets at less frequency intervals. This reduces the draining of the battery but has the downside of further delaying the setup of an incoming call. The present invention transfers the parameter from the controller 34 in the network access device 30 to the controller 42 in the control unit 40 so that the parameter may be advantageously used in other applications.

Moreover, the controller 42 can operate the network access device 30 in the powered state in at least two modes: a continuous power mode and a periodic power mode. In the continuous power mode, the circuitry for at least the receiving portion of the network access device 30 is continuously supplied with power from the battery 50 through the power supply 44. In the periodic power mode, the circuitry for at least the receiving portion of the network access device 30 is periodically supplied with power from battery 50 through the power supply 44. The controller 42 may set up the periodic power mode by determining an on/off duty cycle of the power supply 44. The on/off duty is preferably based on the discontinuous reception parameter and sent to the programmable timer 48 for execution. The programmable timer 48 would then be programmed with the predetermined duty cycle to disable and enable the power supply 44 to the network access device 30.

In another embodiment of the present invention, the power state of the network access device 30 is controlled with the assistance of a battery monitoring function in the controller 34 of the network access device 30. This can be done as a backup feature to the timing scenario described above or as an independent method of controlling the power in a client device 22. In one embodiment, the network access device 30 contains circuitry and software to monitor the voltage being drawn by the network access device 30 after the ignition 56 is shut-off. The network access device 30 would then be configured or otherwise programmed to disable itself from the battery 50 by sending a disable signal to the input 52 of the NAD power supply 44 if the voltage being monitored meets or exceeds a predetermined threshold.

In a further embodiment of the present invention, the powering state of the network access device 30 is controlled with the assistance of a current monitor 54. This can be done as a backup feature to the timing scenario described above or as an independent method of controlling the power in a client device 22. In one embodiment, the current monitor 54 is configured to monitor a current drawn by the client device 22 after the ignition 56 is shut-off. This may be accomplished with a sense resistor and a coulomb counter as described in more detail below. The sense resistor and coulomb counter could be used to monitor an accumulated current drawn by the client device 22 from the battery 50. The current monitor 54 may disable the power by sending a disable signal to the input 52 of the power supply 44 through the programmable timer 48 if the accumulated current meets or exceeds a predetermined threshold. Alternatively, the current monitor 54 could monitor the accumulated current drawn by the network access device 30.

The client device 22 also has a main power supply 46 that provides power to the controller 42 and other components. In some applications, the controller 42 may be electrically connected to a vehicle bus 72 and certain vehicle subsystems to help in the remote control of the vehicle. The vehicle bus 72 can include both vehicle electrical bus and a vehicle data bus. The vehicle subsystems may include an ignition system 56 or a door-locking system 74. In the present invention, a connection to the ignition system 56 may be necessary for the determination of whether the vehicle's engine has been shut-off. After the engine is shut-off, any power consumed by the client device 22 would come from the vehicle's battery 50. A connection to the door-locking system 74 is beneficial to unlock the doors of a vehicle when a user accidentally locks the keys in the vehicle.

The controller 42 can be configured to switch between two power states, a power-off state and a power-on state. In power-off state, the controller 42 consumes little or no power and is essentially in asleep mode. In power-on state, the controller 42 can send and receive messages from the network access device 30 over serial connection 36. The controller 42 may also send and receive messages and commands from other vehicle resources 56, 74, 78.

Alternatively, the controller 42 can be configured to switch between three power states: a power-off state, a low-powered state, and a power-on state. This may be particularly important where the programmable timer 48 is part of, or integral to, the controller 42. If the programmable timer 48 is a part of the controller 42, the programmable timer 48 may be a real-time counter in the controller 42 that is capable of being programmed to wake the controller 42 at an end of the time period determined from the discontinuous reception parameter. In the low-powered state, only the real-time counter may be provided with power. The remaining circuitry in the controller 42 may be put in a sleep mode while the controller 42 is in the low-powered state. In the power-off state, the controller 42 consumes little or no power and all the circuitry is essentially in a sleep mode. In the power-on state, the controller 42 is fully powered and can send and receive messages from the network access device 30 over serial connection 36.

The controller 42 in the client device 22 has a processor 62 for processing algorithms and other data stored in memory 64. The memory 64 may store operating software and variables that may be used in accordance with the present invention. For instance, as explained in more detail below, the memory 64 may store discontinuous reception parameters obtained from the network access device 30. The network access device 30 may obtain these parameters from the network 26 at the time the network access device 30 registers the client device 22 in a networked area. The memory 64 could also store tables, formulas and other data for making certain determinations based on the stored discontinuous reception parameters.

Additionally, the memory 64 may also contain programs and algorithms to monitor and control the power in the client device 22. In one embodiment, when the ignition 56 of the vehicle is turned off, the controller 42 configures the programmable timer 48 for a time period to operate the network access device 30 in a low-powered state. The controller 42 may then be instructed to enter into a power-off state. This has a significant benefit of reducing the power consumption of a client device 22 after the vehicle's engine has been shut-off.

The controller 42 may also be connected to a user interface 78. The user interface 78 may include elements such as a display, a keyboard or keypad, one or more control buttons, indicator lights, one or more speakers, a microphone, and any other user interface type elements for Telematics applications and services. Optionally, the controller 42 may also be connected to a positioning unit (not shown). The positioning unit could be a system that determines the geographic location of the client device 22 or vehicle such as a global positioning system (GPS), a dead-reckoning system, and the like.

Figure 2:
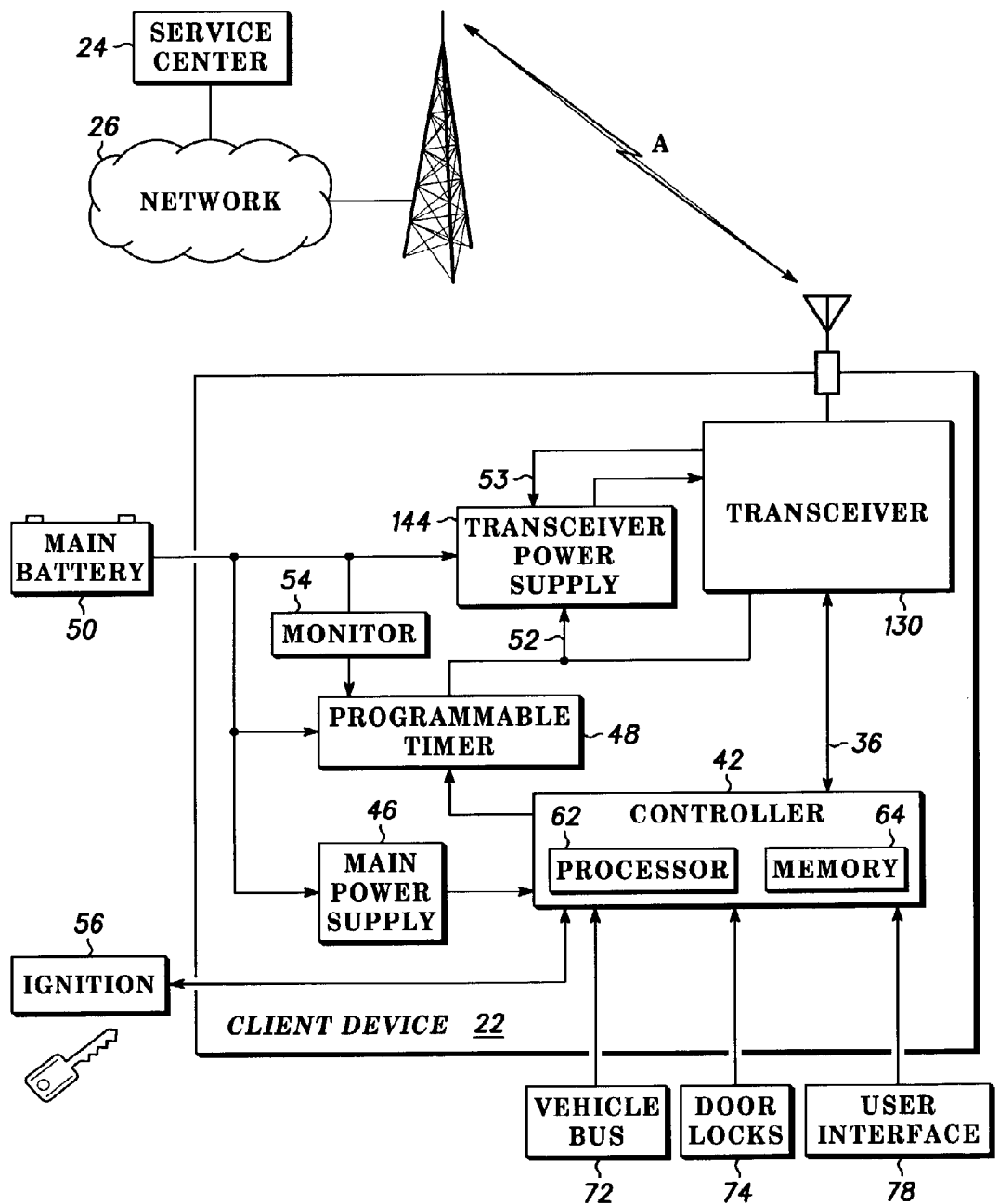
FIG. 2 is a block diagram of a communication system according to another embodiment of the present invention.

FIG. 2 shows an alternative embodiment of the client device 22. In this embodiment, the functions of the controller 34 in the network access device 30 are transferred to the controller 42. In effect, the network access device 30 serves only as a transceiver. This reduces the number of controllers in the system. It may also reduce the power consumed by the client device 22. In particular, the network access device 30 in FIG. 1 is the portion of the client device 22 that remains powered after the controller 42 provides a time period of operation to the programmable timer 48. In the device of FIG. 2, the portion of the client device 22 that remains powered is transceiver 130. In certain applications, it is contemplated that the power consumed by the transceiver 130 is less than the power required for the network access device 30.

In the system shown in FIG. 2, the client device 22 may generally comprise a transceiver 130, a controller 42, a transceiver power supply 144, a main power supply 46, and a programmable timer 48. Depending on the implementation, the client device 22 may have other components such as a current monitor 44 similar to that described above.

Here, the transceiver 130 is used for transmitting uplink communications and receiving downlink communication to and from the network 26 and service center 24 over wireless communication link A. The transceiver 130 is provided power from a battery such as a vehicle's main battery 50. A transceiver power supply 144 may be connected between the transceiver 130 and the vehicle's main battery 50. As will be described in more detail below, the power supply 144 may have an input 52 for disabling the power source to the transceiver 130.

Generally, the transceiver power supply 144 may be disabled by components such as the programmable timer 48 (e.g., after expiration of a time period) or by a current monitor 54 (e.g., after monitoring an excessive accumulated drawn current). Depending on the implementation, the transceiver power supply 144 may be configured to be disabled by other components such as the controller 42. However, it is preferred that the controller 42 be in the power-off state soon after the ignition 56 is shut-off. Similar to the above description, with respect to the programmable timer 48, the controller 42 provides the programmable timer 48 with information on when the power to the transceiver 130 should be disabled. In particular, the controller 42 receives a signal that the vehicle's ignition 56 has been turned off. In response, the controller 42 will then set a time period for the programmable timer 48 to disable the transceiver power supply 144 to the transceiver 130. As will be explained in more detail below, in one embodiment, the time period is based on a discontinuous reception (DRX) parameter from the network 26. The time period may be determined at the time the ignition is shut-off or may be stored in memory 64 after receiving the discontinuous reception parameter from the network 26.

Moreover, the controller 42 can operate the transceiver 130 in the powered state in at least two modes: a continuous power mode and a periodic power mode. In the continuous power mode, the circuitry for at least the receiving portion of the transceiver 130 is continuously supplied with power from the battery 50 through the transceiver power supply 144. In the periodic power mode, the circuitry for at least the receiving portion of the transceiver 130 is periodically supplied with power from battery 50 through the transceiver power supply 144. The controller 42 may set up the periodic power mode by determining an on/off duty cycle of the transceiver power supply 144. The on/off duty is preferably based on the discontinuous reception parameter and sent to the programmable timer 48 for execution. The programmable timer 48 would then be programmed with the predetermined duty cycle to disable and enable the power supply 144 to the transceiver 130.

In another embodiment of the present invention, the power state of the transceiver 130 is controlled with the assistance of a current monitor 54. This can be done as a backup feature to the timing scenario described above or as an independent method of controlling the power in a client device 22. In one embodiment, the current monitor 54 is configured to monitor a current drawn by the client device 22 after the ignition 56 is shut-off. This may be accomplished with a sense resistor and a coulomb counter as described in more detail below. The sense resistor and coulomb counter could be used to monitor an accumulated current drawn by the client device 22 from the battery 50. The current monitor 54 may disable the power by sending a disable signal to the input 52 of the transceiver power supply 144 through the programmable timer 48 if the accumulated current meets or exceeds a predetermined threshold. Alternatively, the current monitor 54 could monitor the accumulated current drawn by the transceiver 130.

Figure 3:
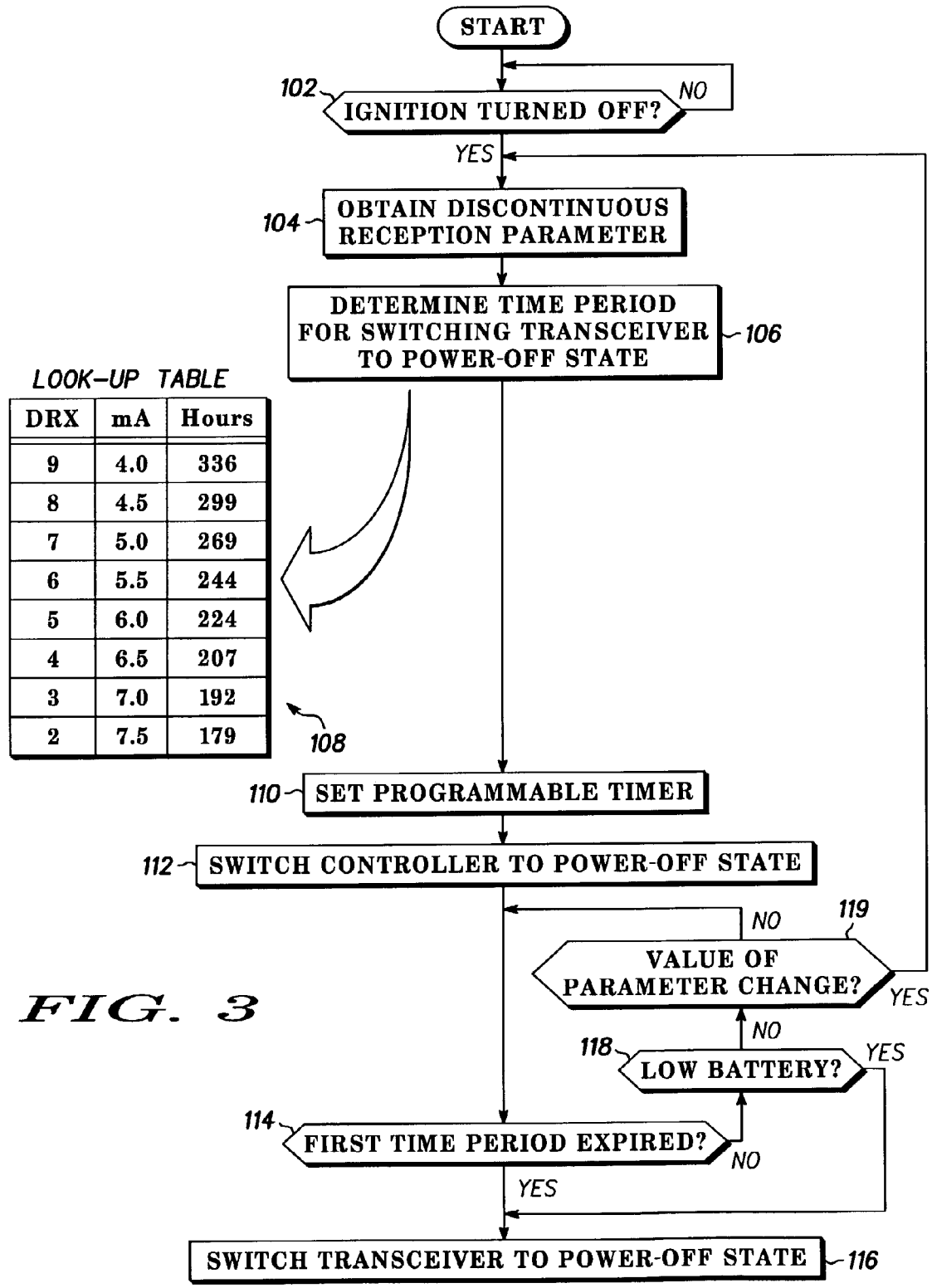
FIG. 3 is a flow diagram of one method for controlling the power in a wireless client device.

In above embodiments, the client device 22 includes at least one controller 42 having a processor 62 that implements software stored in the memory 64. Certain functions of the client device 22 may be implemented in hardware. FIG. 3 illustrates one embodiment of a method according to the present invention. The method begins at decision block 102 where a determination is made whether a triggering event has occurred, such as whether the ignition 56 of the vehicle has been turned off. This determination may be made by the controller 42 during a monitoring process of the ignition system 56. If the ignition 56 has not been turned off, then the process waits at decision block 102 until the ignition 56 has been turned off. When the ignition 56 has been turned off, the process continues to block 104.

At process block 104, the controller 42 obtains a discontinuous reception (DRX) parameter. If the client device 22 uses a GSM network protocol, this DRX parameter may range in value between 2-9. The DRX parameter may be obtained and stored in memory 64 of the client device 22 when the device registers itself with a network 26 in a particular geographic area. A lower value means that the paging messages should be checked by the client device 22 at greater frequency intervals. This reduces the delay in setting up an incoming call but has the downside of draining the battery quicker. A higher value means that the paging messages should be checked by the client device at less frequency intervals. This reduces the draining of the battery but has the downside of further delaying the setup of an incoming call.

At process block 106, the controller 42 uses the DRX parameter to determine a time period for switching the network access device 30 (or transceiver 130) to a power-off state. Hereinafter, for purposes of illustration, the references to the network access device 30 should also be viewed to include transceiver 130, unless otherwise noted. In any event, in one embodiment, the determination of a timer period may be done by using a look-up table 108. A sample look-up table 108 is provided in FIG. 3. The exact values of the time period will depend on the amount of current drawn by the network access device 30, 130 at each level of discontinuous reception. In other words, the exact values for the time periods at each level of discontinuous reception is implementation specific and depends on design details of the network access device 30, 130 and other circuitry in the client device 22 as well as operator preferences. Alternative to the look-up table 108, the controller 42 could obtain the time period through a formula or other algorithm based on the factors mentioned previously. In any event, the time period should relate to a conservative period of time that the network access device 30, 130 could remain powered while keeping the battery 50 above a level that the engine of the vehicle may still be started. After the controller 42 determines an adequate time period, based on the DRX parameter, the process then continues to block 110.

At process block 110, the controller 42 will set the programmable timer 48 so that it is capable of disabling the power to the network access device 30, 130 at the expiration of the time period determined in block 106. The process then proceeds to block 112.

At process block 112, the controller 42 will then set itself to a power-off state. In the power-off state, the controller 42 consumes little or no power and is essentially in a sleep mode. It should be noted that the time period (determined by the controller 42) is processed or otherwise executed by the programmable timer 48. The advantage of using a programmable timer 48 is that it consumes less power than continuing to supply power to the controller 42. The ability to power down the controller 42 at this point significantly reduces the power that may be drawn from the battery 50.

At decision block 114, the programmable timer 48 will wait for the expiration of the time period that was determined by the controller 42. When the time period expires, the process may proceed to block 116 where the network access device 30, 130 is set to a power-off state. Sending a disable signal to the input 52 of the power supply 44, 144 can switch the network access device 30, 130 into a power-off state. In the power-off state, the network access device 30, 130 is not capable of sending or receiving wireless communications over wireless link A. In effect, at this point, the engine of the vehicle would need to be turned back on before the client device 22 could be powered. Alternatively, other triggers, such as a door handle being pulled up, could wake up the client device 22.

While the client device 22 is in the state of waiting for the time period to expire or end, the network access device 30, 130 will be checking for any incoming paging messages from external transmission sources such as the network 26 or other wireless devices. It should be understood that if the client device 22 receives a page during the time period, a signal or interrupt will be sent to the controller 42 so it will wake-up and process the incoming paging message.

In an alternative embodiment, the process further includes decision block 118. At decision block 118, during the time period, the network access device 30 may be configured to perform a battery monitoring function. In one embodiment, the battery monitoring function may reside in the controller 34 of the network access device 30. The controller 34 could monitor a voltage drawn from the battery 50 by the network access device 30. This may be done through an analog to digital converter at power input 38. The controller 34 may then compare the voltage drawn from the battery 50 to a predetermined threshold. The threshold should have some relation to a minimum voltage required by the battery 50 to start the engine of the vehicle. In this embodiment, if the battery 50 is at or below the predetermined threshold, then the network access device 30 would not wait for the full time period to switch the network access device 30 to the power-off state. Instead, the process would proceed to block 116 where the controller 34 sends a disable signal to input 52 of the power supply 44. If the battery 50 is stable, the process may return to decision block 114 for a continued determination of whether the time period has expired. In effect, decision block 118 advantageously serves as a backup process to protect excessive drainage of the battery 50.

In another embodiment, decision block 118 may be done with the use of a current monitor 54. The current monitor 54 would measure and monitor an accumulated current drawn from the battery 50. This accumulated total provides the current-time product, in units such as milliamp-hours, of the current drawn by the client device 22 from the battery 50. The accumulated current could then be compared to a predetermined threshold. The threshold should have some relation to the minimum energy required by the battery 50 to start the engine of the vehicle. This could be provided by the manufacturer of the vehicle. In this embodiment, if the accumulated current drawn from the battery 50 meets or exceed the predetermined threshold, then the network access device would be switched to a power-off state before the expiration of the time period.

In the alternative case where the current monitor 54 is monitoring an accumulated current drawn by the network access device 22, the monitor 54 may be positioned on the other side of the power supply 44, 144. In that case, the threshold should take into account any efficiency improvements caused by using a switching power supply 44, 144 to convert the battery voltage to the network access device 30, 130 operating voltage. Again, if the accumulated current drawn from the battery 50 meets or exceed the predetermined threshold, then the network access device would be switched to a power-off state before the expiration of the time period. This may be accomplished by the current monitor 54 sending a disable signal to input 52 of the power supply 44.

The following example is provided for purposes of illustration. For purposes of this example, it is assumed that the criteria for a particular design is 4 mA current drawn from the battery over a period of 4 weeks. It is assumed that the battery voltage is set to 12 volts and the network access device 30, 130 is set to 3 volts. If the switching power supply 44, 144 has 100% efficiency, the following relations (1)-(3) applies:

$$Po = Pi \qquad (1)$$

$$Vo \times Io = Vi \times Ii \qquad (2)$$

$$Io = Ii \times (Vi/Vo) \qquad (3)$$

where Po is the power output and Pi is the power input of the power supply 44, 144; Vo is the voltage output and Vi is the voltage input of the power supply 44, 144; Io is the current input and to is the current output of the power supply 44, 144.

However, in reality, the use of power supply 44, 144 will not result in 100% efficiency. Accordingly, the power supply efficiency (eff) should be accounted for as shown in relation (4):

$$Io = Ii \times (Vi/Vo) \times eff \qquad (4)$$

If the power supply 44, 144 were 75% efficient at the current levels used by the network access device 30, 130 when idle, this would yield a total allowable draw of 12 mA for 4 weeks or 8064 milliamp hours. Other factors such as current drawn by the monitor 54 and any other bias currents should be considered to subtract off this number. The result can be used to determine a predetermined threshold.

In one embodiment, the monitor 54 may include components such as a sense resistor and a counter. The counter may be a coulomb counter. When the car ignition 56 is turned off, the counter is cleared. The counter would then count up at a rate proportional to the current passing through the sense resistor. The counter could be compared to the predetermined threshold. When the counter meets or exceeds the threshold, the monitor 54 may generate an alarm or send a disable signal to the power supply 44, 144.

In a further embodiment, the process further includes decision block 119. At decision block 119, during the time period, the network access device 30, 130 may be configured to wake up controller 42 upon a change in the value for the discontinuous reception parameter. If no change is detected, then the process may go back to determining whether the first time period has expired. However, when the network access device detects a change in value, the controller 42 is awakened and processing continues back at process block 104. A new discontinuous reception parameter is obtained at block 104 and then used in process block 106 to calculate or determine a new time period or timeout value. The calculation or determination of the new timeout value may take into account the amount of time the network access device was operating at the previous value for the discontinuous reception parameter. In a system where the value of the discontinuous reception parameter is expected to change multiple times during the time period, the controller 42 could maintain a running estimate of total milliamp-hours consumed based on the amount of time spent at each discontinuous reception level. Then the new timeout value could be calculated based on the total allowable milliamp-hours, the new discontinuous reception level, and the expected current draw for the new discontinuous reception level obtained from look-up table 108.

Figure 4:
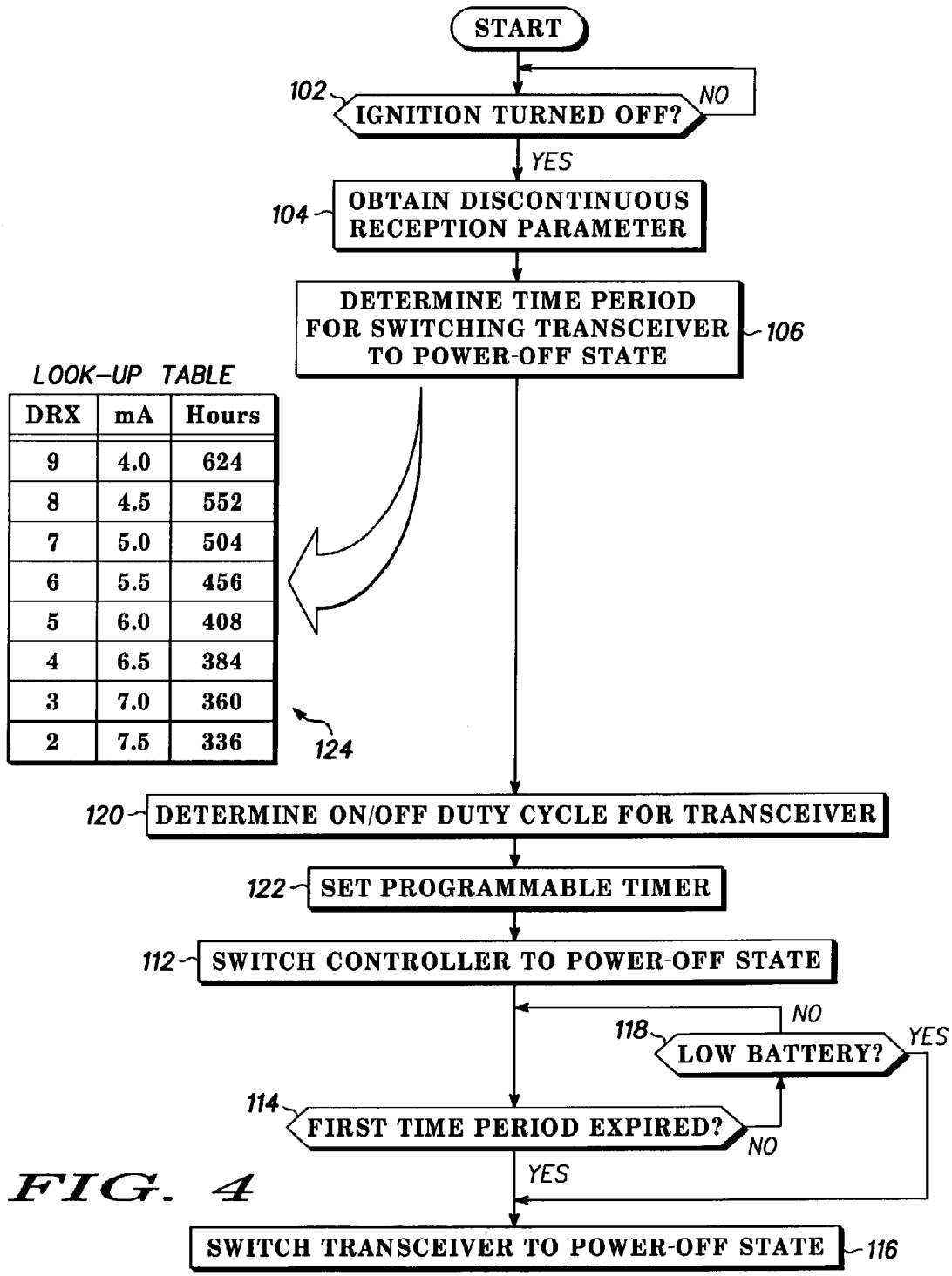
FIG. 4 is a flow diagram of another method for controlling the power in a wireless client device.

FIG. 4 illustrates another embodiment of a method according to the present invention. The method is similar to the one described in FIG. 3 but with the additional process blocks 120 and 122. In particular, after the controller 42 determines a time period for leaving the network access device 30, 130 in a powered state, the process continues to block 120. At block 120, the controller 42 further determines an on/off duty cycle of the power supply 44 for the network access device 30, 130. The benefit of this step in the process is that client device 22 will consume less power than when the network access device 30, 130 is a continuous powered state. In particular, a different look-up table 124 or other algorithm or formula may be used that factors in the network access device 30, 130 operating in a periodic power mode. In the periodic power mode, the circuitry for at least the receiving portion of the network access device 30, 130 is periodically supplied with power from battery 50 through the power supply 32. The controller 42 may set this up in process block 122 after the determination of an on/off duty cycle for the power supply 44. The on/off duty cycle is preferably based on the discontinuous reception (DRX) parameter and supplied to the programmable timer 48. After the controller 42 sets the on/off duty cycle of the power supply, the process may then continue back to process block 112 where the controller 42 is set to a power-off state as described in more detail above.

Figure 5:
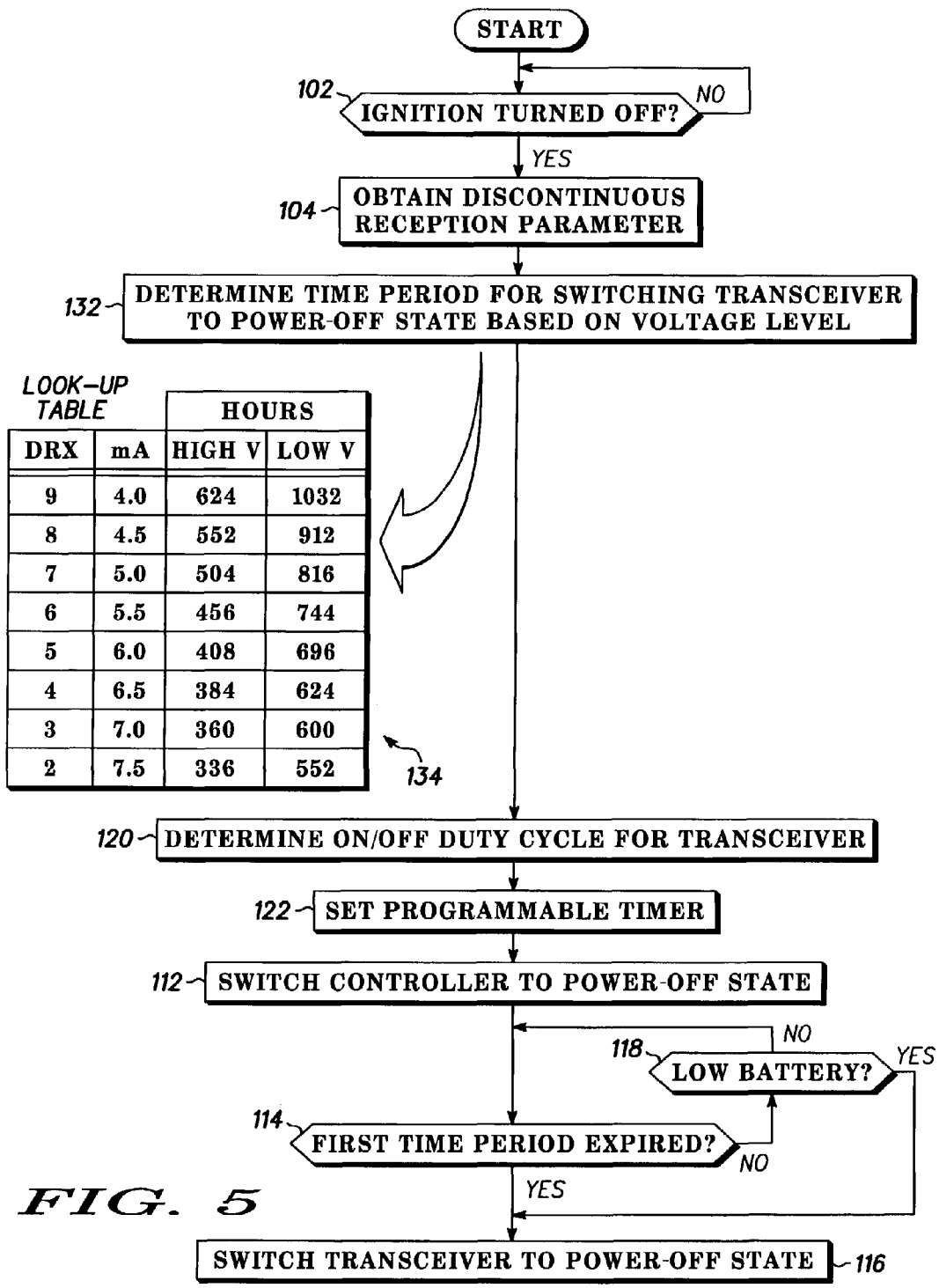
FIG. 5 is a flow diagram of a further method for controlling the power in a wireless client device.

FIG. 5 illustrates another embodiment of a method according to the present invention. The method is similar to the ones described in FIGS. 3 and 4 but with the additional process block 132. In particular, after the controller 42 obtains the discontinuous reception parameter, the controller 42 will then determine a time period for leaving the network access device in a powered state after the ignition is shut-off. Process block 132 is different from 106 in that it further considers different voltage levels that the network access device 30, 130 may operate. In particular, the network access device 30, 130 will consume significantly lower power if operated in a low voltage level. For instance, in some applications during normal operation when the ignition is on, a network access device 30, 130 may operate at about 5 volts in order to achieve the required output power. When monitoring paging messages, the network access device 30, 130 may be capable of being operate at a lower voltage level such as 3 volts. This will significantly increase the value of the time period that the network access device 30, 130 may be powered. The switching from a normal operating voltage to a relatively low operating voltage may be done through input 53. In the preferred embodiment, when the ignition is turned off and the unit is not transmitting, the voltage for the network access device 30, 130 would be set to the lower voltage level.

As a result, the process block 132 may use a look-up table 134, formula or other algorithms that takes into account whether the network access device 30, 130 is operating at a lower than normal voltage level. The process would then continue to process block 120 where the controller 42 determines an on/off duty cycle. Again, as mentioned above, the on/off duty cycle is preferably based on the discontinuous reception parameter and supplied to the programmable timer 48 for execution.

Figure 6:
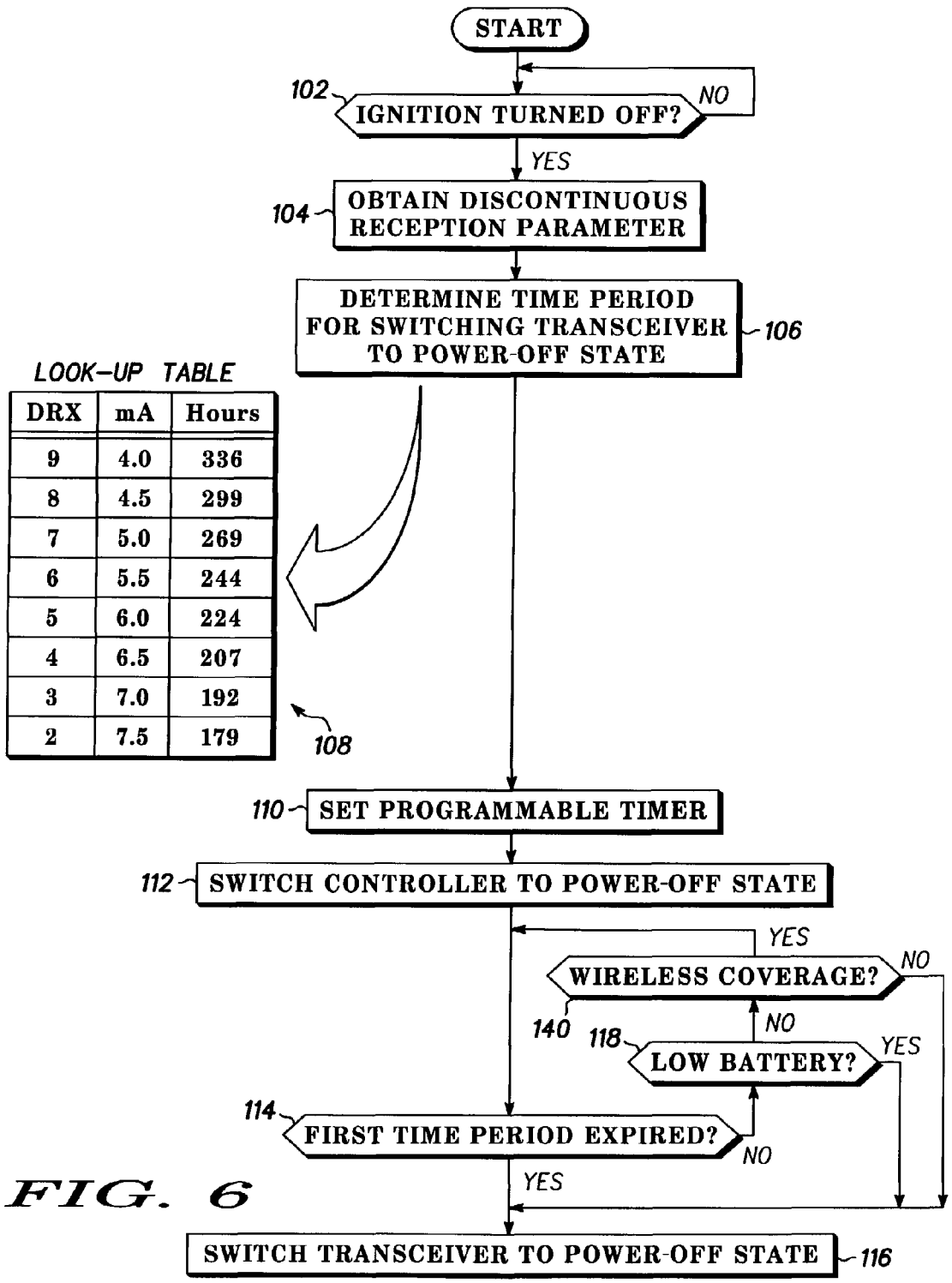
FIG. 6 is a flow diagram of yet another method for controlling the power in a wireless client device.

FIG. 6 illustrates another embodiment of a method according to the present invention. The method is similar to the one described in FIG. 3 but with the additional decision block 140. In particular, during the time period, the network access device 30 may be configured to make a determination whether wireless coverage is still being provided to the client device 22. This may occur if the client device 22 (or vehicle) resides in an area of very poor or no coverage. In this case, it may not be desirable to further drain the battery 50 when the client device 22 could not receive communications. Accordingly, in this embodiment, if there is no wireless coverage, then the network access device 30 would not wait for the full time period to switch the network access device 30 to the power-off state. Instead, the process would proceed to block 116 where the network access device 30 sends a disable signal to input 52 of the power supply 44. In determining whether wireless coverage exists, a fixed length of time should be considered in the evaluation. It would not be beneficial to shut-off the network access device 30 if there is just a temporary, intermittent lack of wireless coverage. In any event, if the battery 50 is stable, the process may return to decision block 114 for a continued determination of whether the time period has expired. In effect, decision block 140 advantageously serves as a backup process to protect excessive drainage of the battery 50.

What has been described is a system and method for controlling the power in a wireless client device. The system and method protects the battery that powers the client device from being excessively drained. This is especially important in Telematics applications and services after the ignition of a vehicle is shut-off. Additionally, the system and method advantageously extends the operational period that Telematics applications and services may be offered after the ignition of the vehicle is shut-off. The above description of the present invention is intended to be exemplary only and is not intended to limit the scope of any patent issuing from this application. The present invention is intended to be limited only by the scope and spirit of the following claims.

What is claimed is:

1. An apparatus comprising:
   a network-access device;
   a programmable timer operatively coupled to the network-access-device;
   a controller operatively coupled to the programmable timer, the controller configured to:
   obtain a discontinuous-reception parameter that specifies a frequency for checking paging messages,
   determine a time period for switching the network-access device to a power-off state based on the discontinuous-reception parameter such that, when the discontinuous-reception parameter specifies a relatively greater frequency for checking paging messages, the time period for switching the network-access device to the power-off state is reduced, and, when the discontinuous-reception parameter specifies a relatively lesser frequency for checking paging messages, the time period for switching the network-access device to the power-off state is increased, configure the programmable timer to disable power to the network-access device upon expiration of the determined time period.

2. The apparatus of claim 1, wherein the discontinuous-reception parameter specifies the frequency for checking paging messages in a way that does not depend upon time-of-day information.

3. The apparatus of claim 1, wherein the network-access device is configured to obtain the discontinuous-reception parameter when the network-access device registers with a wireless network in a particular geographic region.

4. The apparatus of claim 3, wherein the controller is further configured to obtain the discontinuous-reception parameter from the network-access device.

5. The apparatus of claim 1, wherein the controller is further configured to:

determine an on/off duty cycle for the network-access device based on the discontinuous-reception parameter such that, when the discontinuous-reception parameter specifies a relatively greater frequency for checking paging messages, the on/off duty cycle is reduced, and, when the discontinuous-reception parameter specifies a relatively lesser frequency for checking paging messages, the on/off duty cycle is increased; and configure the programmable timer to cause power to be periodically supplied to the network-access device in accordance with the determined on/off duty cycle.

6. The apparatus of claim 5, wherein the discontinuous-reception parameter specifies the frequency for checking paging messages in a way that does not depend upon time-of-day information.

7. The apparatus of claim 5, wherein the network-access device is configured to obtain the discontinuous-reception parameter when the network-access device registers with a wireless network in a particular geographic region.

8. The apparatus of claim 7, wherein the controller is further configured to obtain the discontinuous-reception parameter from the network-access device.

9. An apparatus comprising:

a processor;

a memory having stored therein computer-executable instructions that, when executed, cause the processor to:

obtain a discontinuous-reception parameter that specifies a frequency for checking paging messages;

determine a time period for switching a network-access device to a power-off state based on the discontinuous-reception parameter such that, when the discontinuous-reception parameter specifies a relatively greater frequency for checking paging messages, the time period for switching the network-access device to the power-off state is reduced, and, when the discontinuous-reception parameter specifies a relatively lesser frequency for checking paging messages, the time period for switching the network access device to the power-off state is increased;

configure a programmable timer to disable power to the network-access device upon expiration of the determined time period.

10. The apparatus of claim 9, wherein the discontinuous-reception parameter specifies the frequency for checking paging messages in a way that does not depend upon time-of-day information.

11. The apparatus of claim 9, wherein the memory has stored therein additional computer-executable instructions that, when executed, cause the processor to: obtain the discontinuous-reception parameter when the network-access device registers with a wireless network in a particular geographic region.

12. The apparatus of claim 9, wherein the memory has stored therein additional computer-executable instructions that, when executed, cause the processor to:

determine an on/off duty cycle for the network-access device based on the discontinuous-reception parameter such that, when the discontinuous-reception parameter specifies a relatively greater frequency for checking paging messages, the on/off duty cycle is reduced, and, when the discontinuous-reception parameter specifies a relatively lesser frequency for checking paging messages the on/off duty cycle is increased; and configure the programmable timer to cause power to be periodically supplied to the network-access device in accordance with the determined on/off duty cycle.

13. The apparatus of claim 12, wherein the discontinuous-reception parameter specifies the frequency for checking paging messages in a way that does not depend upon time-of-day information.

14. The apparatus of claim 12, wherein the memory has stored therein additional computer-executable instructions that, when executed, cause the processor to obtain the discontinuous-reception parameter when the network-access device registers with a wireless network in a particular geographic region.

15. A method comprising:

obtaining a discontinuous-reception parameter that specifies a frequency for checking paging messages;

determining a time period for switching a network-access device to a power-off state based on the discontinuous-reception parameter such that, when the discontinuous-reception parameter specifies a relatively greater frequency for checking paging messages, the time period for switching the network access device to the power-off state is reduced, and, when the discontinuous-reception parameter specifies a relatively lesser frequency for checking paging messages, the time period for switching the network-access device to the power-off state is increased;

configuring a programmable timer to disable power to the network-access device upon expiration of the determined time period.

16. The method of claim 15, wherein the discontinuous-reception parameter specifies the frequency for checking paging messages in a way that does not depend upon time-of-day information.

17. The method of claim 15, further comprising: obtaining the discontinuous-reception parameter when the network-access device registers with a wireless network in a particular geographic region.

18. The method of claim 15, further comprising:
determining an on/off duty cycle for the network-access device based on the discontinuous-reception parameter such that, when the discontinuous-reception parameter specifies a relatively greater frequency for checking paging messages, the on/off duty cycle is reduced, and, when the discontinuous-reception parameter specifies a relatively lesser frequency for checking paging messages, the on/off duty cycle is increased; and
configuring the programmable timer to cause power to be periodically supplied to the network-access device in accordance with the determined on/off duty cycle.

19. The method of claim 18, wherein the discontinuous-reception parameter specifies the frequency for checking paging messages in a way that does not depend upon time-of-day information.

20. The method of claim 18, further comprising: obtaining the discontinuous-reception parameter when the network-access device registers with a wireless network in a particular geographic region.

* * * * *